United States Patent [19]

Monsen

[11] Patent Number: 5,339,558
[45] Date of Patent: Aug. 23, 1994

[54] ICE FISHING DEVICES

[76] Inventor: Arthur M. Monsen, Box 800, Banton Rd., Palermo, Me. 04354

[21] Appl. No.: 35,351

[22] Filed: Mar. 22, 1993

[51] Int. Cl.⁵ .............................................. A01K 97/12
[52] U.S. Cl. ...................................................... 43/17
[58] Field of Search ............................. 43/17, 4, 15, 16

[56] References Cited

U.S. PATENT DOCUMENTS

| | | | |
|---|---|---|---|
| 2,654,176 | 10/1953 | Kachelski et al. | 43/17 |
| 3,641,693 | 2/1972 | Pinnow | 43/17 |
| 4,021,958 | 5/1977 | Snodie | 43/17 |
| 4,121,367 | 10/1978 | Gonnello | 43/16 |
| 4,310,983 | 1/1982 | Irvin et al. | 43/17 |
| 4,727,673 | 3/1988 | Dumar | 43/17 |
| 5,157,855 | 10/1992 | Schmidt et al. | 43/17 |

Primary Examiner—P. Austin Bradley
Assistant Examiner—Chuck Y. Mah

[57] ABSTRACT

An ice fishing device has a support dimensioned to overlie a hole through the ice of a predetermined maximum cross sectional area with a tubular post extending through it with a central portion thereof connected thereto. A shaft extends through the post with a holder fixed on the upper end thereof and a reel axially connected to the lower end thereof. A resilient mast is attached to the support and has a free end in the form of a rod to be held by the holder. The holder has an end wall extending laterally of the shaft and is vertical when the device is in use. The holder has a retaining wall disposed to overlie the rod when manually positioned thereunder then to be resiliently held substantially at the junction of the two walls until a fish taking the bait, exerts a pull on the line causing the shaft to turn with the end wall camming the rod free of the holder.

6 Claims, 4 Drawing Sheets

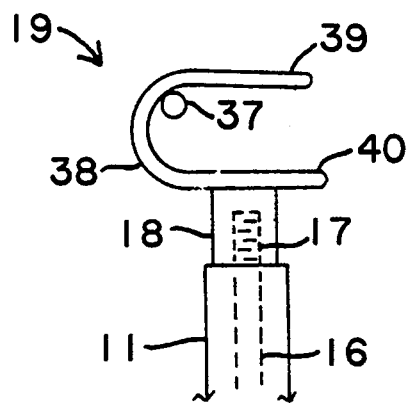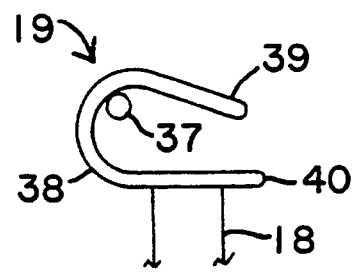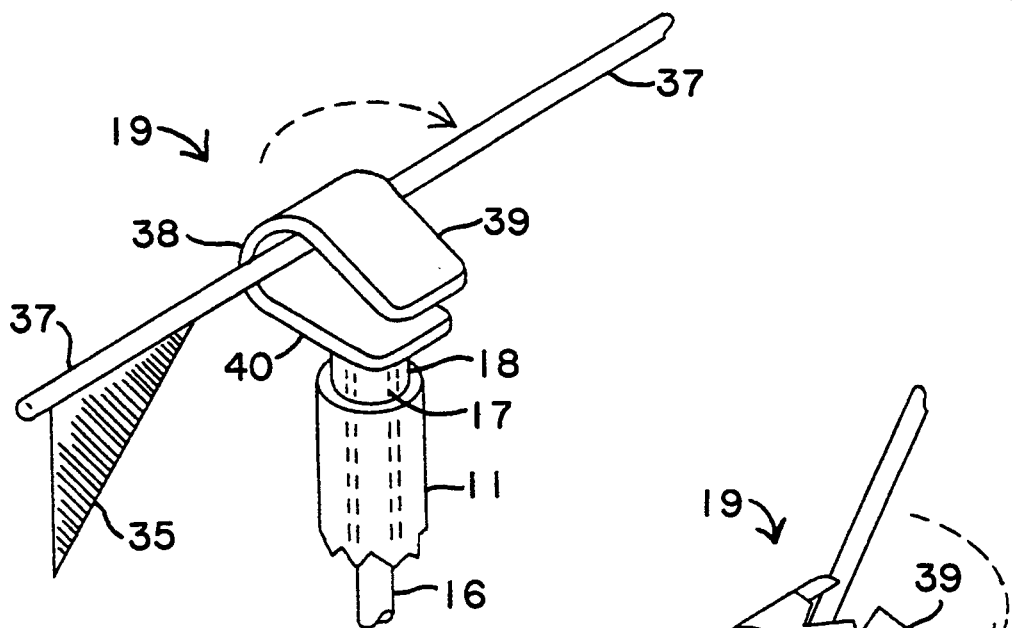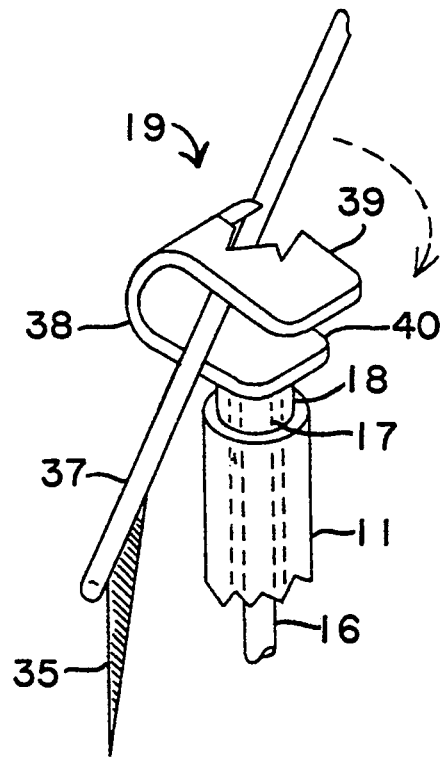
FIG.3
FIG.4
FIG.5
FIG.6

ICE FISHING DEVICES

Ice fishing is a sport to which increasing numbers are being attracted and devices for use in ice fishing, sometimes called traps, have been improved with those of the type having underwater reels usually preferred.

One of the objectionable features of presently available ice fishing devices is that when set for use, the flag on a mast or other signal may not be released when the bait is taken by a fish or the signal may be released as by the wind causing a false alarm.

Devices employing reels which are to be submerged when the devices are in use have supports dimensioned to straddle holes in the ice. Each support rotatably supports a shaft having one end disposed with the reel axially connected thereto and its other end in support of a holder under one end of which a portion of a resilient member, serving as a mast for the signal, may be positioned and thus held by the resiliency of the mast. Such holders have not been found acceptable as when one end has been turned sufficiently to release the mast, the other end may reengage it and, in any event, release is determined only by frictional engagement of the mast with the holder. U.S. Pat. No. 4,021,958 teaches the use of such a holder made of a material which may be deformed to increase the frictional resistance.

THE PRESENT INVENTION

The general objective of the present invention is to provide holders having the advantages of such previously discussed holders but which utilize a camming action to provide positive release of the resilient member while also enabling frictional resistance to that action to be reduced or increased as desired.

The ice fishing devices have tubular posts connected to the supports which straddle holes through the ice then to hold the posts vertically. A rotatable shaft extends through each post with its ends exposed. A reel is axially connected to the water entering end of the shaft and the holder is connected to the other or upper end thereof. Each holder has an end wall extending vertically and laterally with respect to the shaft axis and at least one retaining wall extending laterally with respect to the upper edge of the first named wall to enable a portion of the resilient mast to be entered thereunder with the mast then disposed transversely of the support and seated close to the junction of the walls of the holder and resiliently held in place.

The end wall of the holder may be located axially with respect to the axis of the post or it may be located on either opposite side thereof. If located on the side of that axis opposite the free extremity of the retaining wall, the holder is U-shaped and that portion of the holder on said opposite side does not enable the resilient member to be held thereby. In any event, the holder is so shaped and dimensioned that the risk of being affected by wind is eliminated. Desirably at least the retaining wall which is to overlie the resilient member is of a material which may be deformed digitally either to increase or decrease the frictional resistance to the camming action of the end wall of the holder.

Where the post extends through a hole or port in the support and particularly where the support is a cover for the hole through the ice, it is a feature of the present invention that the post, with its reel and holder, is detachably attached to the support by inserting the post upwardly through the port in the support. It will be appreciated that the size of a reel, were it to be passed downwardly through a port, would require that the port be objectionably large in size which is not the case of the holder. With the post provided with a boss the cross sectional area of which is slightly greater than that of the holder, the size of the port through the support is minimized. Such a boss is detachably attached to the support to complete the assembly of the device and enables the device to be easily disassembled.

BRIEF DESCRIPTION OF THE DRAWINGS

The accompanying drawings illustrate preferred embodiments of the invention with FIG. 1 a side view of an ice fishing device in accordance with the invention with the device set for use;

FIG. 3 is a fragmentary side view of the upper end of the shaft and the holder;

FIG. 4 is a side view of the holder with its retaining wall inclined downwardly to increase the resistance to the freeing of the mast;

FIG. 5 is a fragmentary, perspective view of the holder and the rigid tip of the flexible flag-carrying resilient mast;

FIG. 6 is a like view with the tip of the mast being cammed free of the holder.

THE PREFERRED EMBODIMENT

Figure 1:
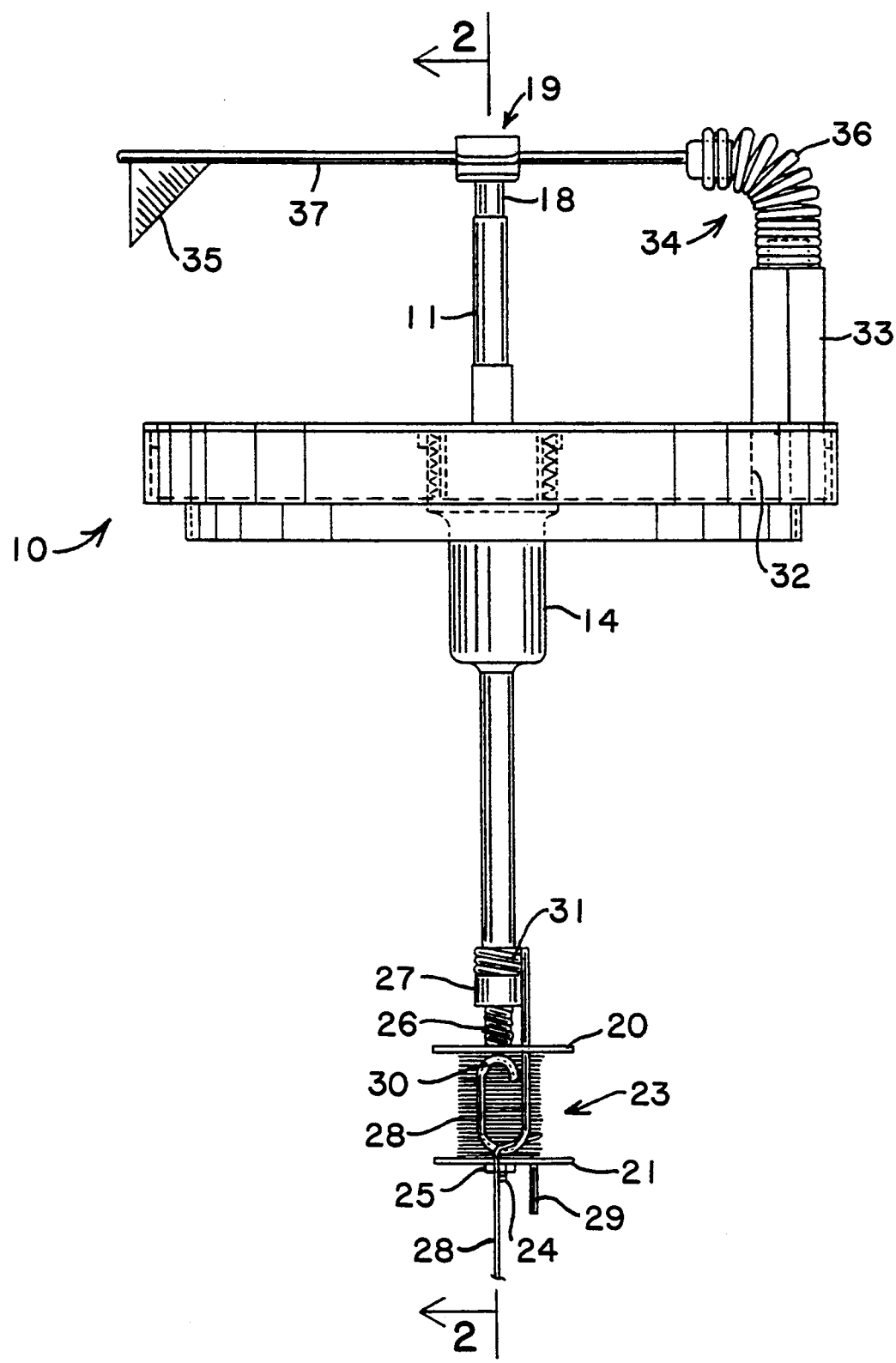

The present invention is illustrated as including a support, generally indicated at 10, for the tubular post 11 with the support 10 generally of the insulated type shown and described in my U.S. Pat. No. 4,993,182. The support 10 differs from the support of that patent in that it has a central, internally threaded port 12 to receive the threaded upper section 13 of a boss 14 with which the post 11 is provided and which has a stop flange 15 engageable with the under surface of the support 10 when the post section 13 is fully threaded in the port 12.

A shaft 16 extends through the post 11 with its exposed upper end 17 of reduced diameter and threaded to receive the internally threaded hub 18 with which the generally indicated U-shaped holder 19 is provided to enable the holder to be secured to the post. The lower end of the shaft 16 is shown as extending from the post 11 and axially through the sidewalls 20 and 21 and the hub 22 of a reel, generally indicated at 23. The exposed end of the shaft 16 is threaded as at 24 to receive a nut 25 holding the reel 23 against a spring 26 backed by the headed lower end 27 of the post 11 thus to provide an adjustable drag against the turning of the reel 23. Line 28 is wound about the reel hub 22 with the lower reel sidewall 21 is provided with a handle 29. A line guide 30 has a coiled end which establishes a sleeve 31 which is a free fit on the post 11 and rests on the headed end 27 thereof. The line guide 30 turns about the post 11 as the reel 23 turns with the shaft 16 against the drag provided by the spring 26.

Detachably held in an upwardly opening square socket 32 in the support 10 is the rigid square or round base 33 of the generally indicated resilient mast 34 for a flag 35 and is shown as of the type having a flexible, resilient coiled spring section 36 to the free end of which a rod 37, provided with the flag 35 is connected.

The holder 19 is shown as U-shaped and connected to the shaft 16 to be open in a plane normal to the axis thereof and is so dimensioned that it can be passed upwardly through the port 12 until the upper section of the boss 14 is fully threaded in the port 12. When the resilient mast 34 is manually so flexed that the rod 37 may be entered in the holder 19 if positioned to enable the rod 37 to be so entered, then to extend transversely of the support 10. In use, line 28 is pulled from the reel 23 to provide the length required to place the baited hook, not shown, at the selected depth. As the line 28 is pulled from the reel 23, manually or by the pull of a fish, the shaft 16 and accordingly the holder 19 are turned in the direction of the arrow in FIG. 6.

The holder 19 provides an end wall 38 which extends laterally with respect to the axis of the shaft 16 and is vertical when the device is in use. It is also essential that the holder 19 have a wall 39 to overlie and retain the tensioned rod 37 of the mast. An advantage of a U-shaped holder is that it provides a supporting wall 40 to the under surface of which the hub 18 is fixed. It is preferred that the holder 19 be fixed on the upper end of the shaft 16 with the open end of the holder and the end wall 38 on opposite sides of the axis of the shaft 16.

In use, a pull on the line 24 strong enough to turn the shaft 16 results in the then leading edge of the end wall 38 at its junction with the retaining wall engaging the rod 37 and camming it towards the open end of the holder 19 until the rod is freed to permit the mast 34 to become erect with its flag 35 signalling that a fish has taken the bait.

It will be appreciated that since the rod 37 of the mast 35 is held against the retaining wall 39 there is frictional resistance to the positive movement of the rod by the end wall 38. This resistance can be varied as by forming the holder 19 with its retaining wall inclined towards the supporting wall 40. Accordingly, it is preferred that the holder be formed from a metal strip such that the retaining wall may be digitally deformed to establish various degrees of resistance to the rod 37 being subjected to the camming action of the holder 19.

Figure 2:
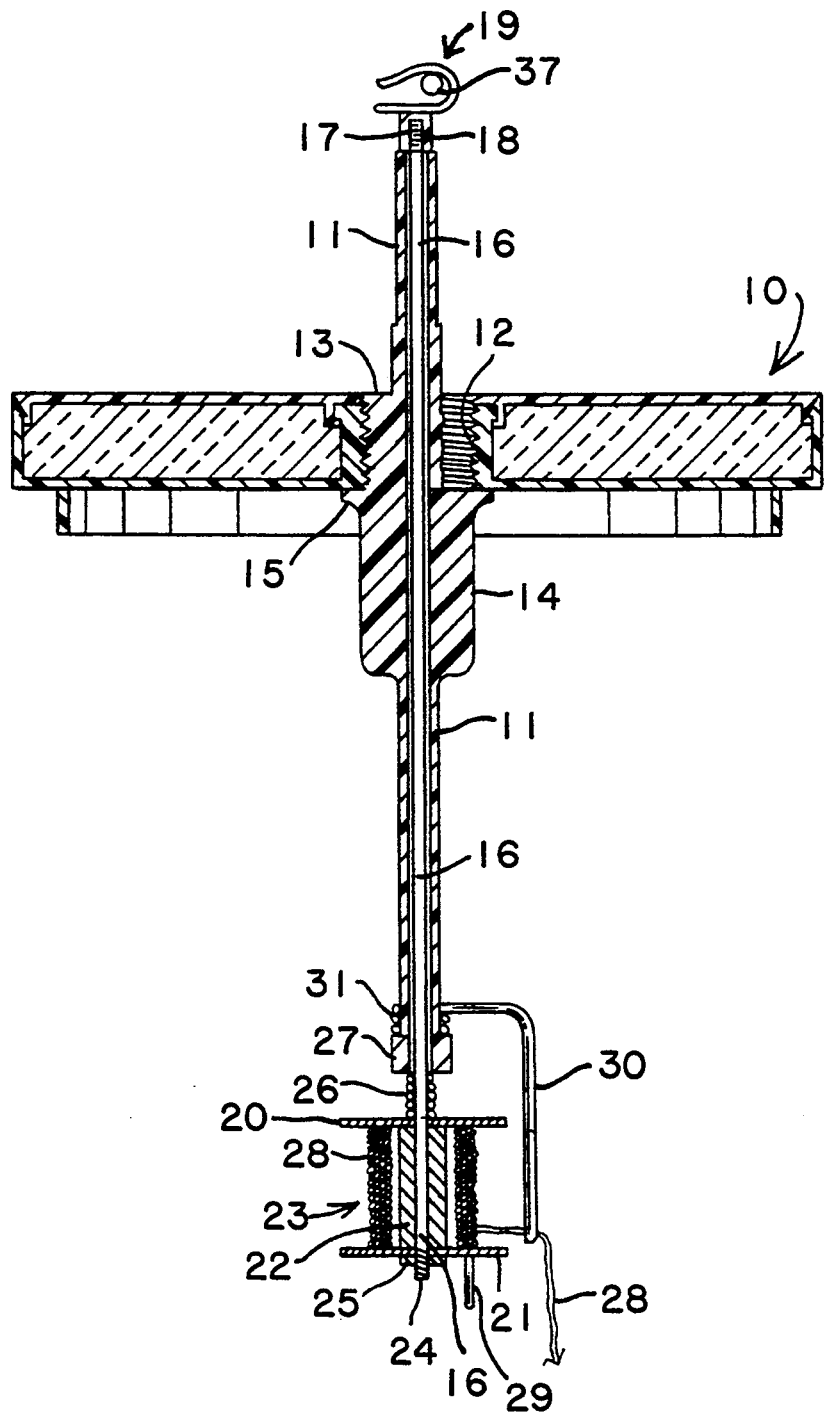
FIG. 2 is a section taken approximately along the indicated line 2—2 of FIG. 1.
Figure 7:
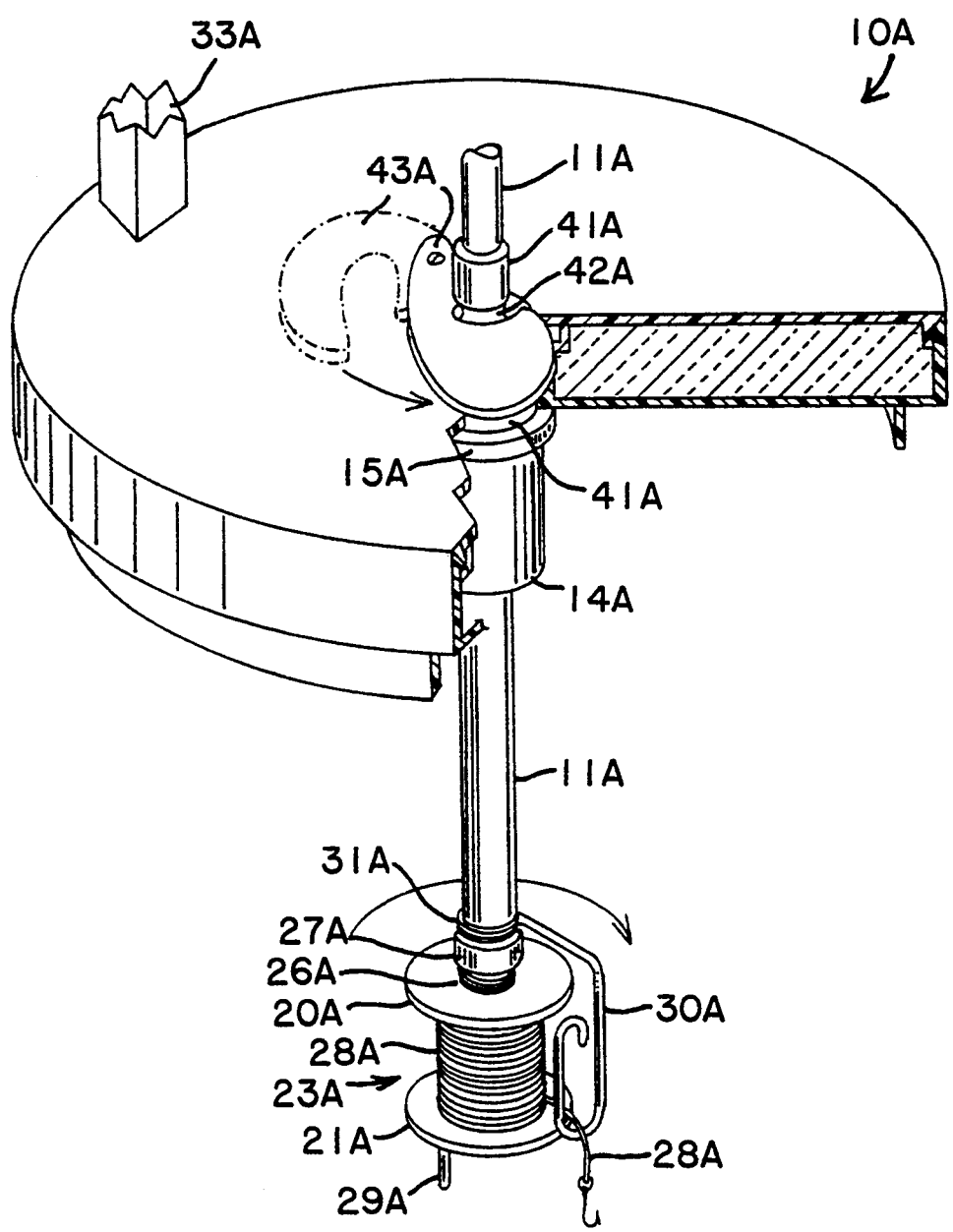
FIG. 7 is a perspective and partly broken away view illustrating another type of connection between the post and the support.

FIG. 7 illustrates an ice fishing device identical to that shown in FIGS. 1 and 2 except for the connection between the post and the holder. Corresponding parts, where identical, are designated by the same reference numerals but are distinguished by the suffix addition A.

In this embodiment of the invention the diameter of the boss 41 is slightly greater than that of the boss 14 and is provided with an annular channel 42 so located that when the post 11A is inserted upwardly through the port 12A of the support 10A until the stop flange 15A is seated against the undersurface of the support 10A, the channel 42 is exposed above the upper surface of the support 10 to an extent such that a latch 43, pivotally connected to said upper surface, may be swung from an inoperative, broken line positioned into the channel 42 then detachably interconnecting the post 11A to the support 10A.

It will be appreciated that with the posts detachable from the supports and the base of the masts detachably held by the sockets of the supports, the devices may be shipped and stored compactly and quickly and easily assembled when their use is wanted.

I claim:

1. An ice fishing device, said device including a support dimensioned to overlie a hole through the ice of a predetermined maximum cross sectional area, a tubular post having first and second ends, the post held by the support with the first end thereof to be above, and the second end to be below the support when the support is in a position for use, a shaft extending through and rotatably held by the post and having first and second ends with the first and second ends extending beyond the corresponding ends of the post, a resilient mast having first and second ends, the first end connected to the support so that the mast is normally erect at one side of the post when in said position of use, a holder to releasably hold the second end of the mast and connected to the first end of the shaft to turn therewith, the second end of the mast consisting of a rod, the holder comprising first and second interconnected walls, each wall of a length and width greater than the diameter of the rod, said walls disposed above the shaft in a position substantially normal with respect to the axis thereof, establishing the first wall as an end wall and the second wall as a retaining wall disposed to overlie the rod end of the mast when manually so positioned that the rod is resiliently held substantially at the junction of the walls, a reel axially connected to the second end of the shaft, said reel provided with a line wound thereon, and a line guide rotatably connected to the second end of the post whereby, when a wanted length of line is pulled from the reel and held by the guide and the resilient mast is manually tensioned and the rod end thereof held by the holder, a subsequent pull on the line is operable to turn the shaft and cause an end edge of the end wall of the holder to become a cam continually engaging the rod of the mast and forcing it away from the original position thereof until the other wall is positioned to permit the rod of the mast to escape from the holder.

2. The ice fishing device of claim 1 in which the retaining wall is disposed relative to a plane normal to the axis of the shaft and is digitally deformable to provide a wanted degree of resistance to the camming action of the end wall.

3. The ice fishing device of claim 1 in which the holder includes an integral supporting wall establishing the holder as U-shaped and dimensioned to enable the rod of the mast to be entered therein, and said supporting wall is connected to the extremity of the shaft in a position centering the holder relative to the axis of the shaft.

4. The ice fishing device of claim 3 in which the holder is formed of digitally deformable stock.

5. The ice fishing device of claim 4 in which the support is provided with an internally threaded, open ended port dimensioned to accommodate the post and the holder but not the reel and the post includes an externally threaded portion between the ends thereof dimensioned to enable the post and support to be threaded together when the device is to be used and separated for convenience in transportation or storage.

6. The ice fishing device of claim 4 in which the support has an open ended port, the post has a portion between the ends thereof dimensioned to be a slidable fit in the port and has an annular groove exposed above the uppermost surface of the support when fitted in the port and a latch is pivotally attached to said surface and is shaped and dimensioned to be pivoted into and out of locking engagement with the annular groove to enable the post and support to be connected to assemble the device for use and separated for convenience in transportation and storage.

* * * * *